(12) United States Patent
Zhang et al.

(10) Patent No.: US 10,902,410 B2
(45) Date of Patent: Jan. 26, 2021

(54) ELECTRONIC PAYMENT DEVICE

(71) Applicant: Advanced New Technologies Co., Ltd., Grand Cayman (KY)

(72) Inventors: Mingwei Zhang, Hangzhou (CN); Fenghuan Gu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/812,159

(22) Filed: Mar. 6, 2020

(65) Prior Publication Data

US 2020/0210989 A1 Jul. 2, 2020

Related U.S. Application Data

(63) Continuation of application No. PCT/CN2020/071359, filed on Jan. 10, 2020.

(30) Foreign Application Priority Data

Jul. 15, 2019 (CN) ...................... 2019 2 1108573 U

(51) Int. Cl.
G06Q 20/32 (2012.01)
(52) U.S. Cl.
CPC ................... *G06Q 20/3276* (2013.01)
(58) Field of Classification Search
CPC ..... G06F 1/1632; G06Q 20/204; G07F 7/088; G07G 1/0018
See application file for complete search history.

(56) References Cited

U.S. PATENT DOCUMENTS

| | | | |
|---|---|---|---|
| D857,791 S * | 8/2019 | Luo | ................................ D18/4.4 |
| 2006/0255134 A1 | 11/2006 | Schmidt et al. | |
| 2013/0262248 A1 * | 10/2013 | Kim | ...................... G06F 1/1632 |
| | | | 705/17 |
| 2014/0239065 A1 | 8/2014 | Zhou et al. | |
| 2015/0022505 A1 | 1/2015 | Lee | |
| 2017/0076269 A1 | 3/2017 | Saeed et al. | |
| 2018/0095588 A1 | 4/2018 | Klein et al. | |
| 2019/0066076 A1 * | 2/2019 | Lee | ........................ G06F 1/1632 |

FOREIGN PATENT DOCUMENTS

| | | |
|---|---|---|
| CN | 204028987 U | 12/2014 |
| CN | 205508014 U | 8/2016 |
| CN | 205751077 U | 11/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Seung H Lee
(74) *Attorney, Agent, or Firm* — Fish & Richardson P.C.

(57) ABSTRACT

The present specification provides an electronic payment device, including a console, where the console includes a housing and a speaker inside the housing, the housing comprises a first sidewall and a second sidewall that extends obliquely from the first sidewall and forms a covered space with the first sidewall, the covered space comprises a hollow space, and the speaker is disposed at an orientation that faces the hollow space.

17 Claims, 2 Drawing Sheets

(56) References Cited

FOREIGN PATENT DOCUMENTS

| | | |
|---|---|---|
| CN | 206470887 U | 9/2017 |
| CN | 207302244 U | 5/2018 |
| CN | 207367263 U | 5/2018 |
| CN | 207558116 U | 6/2018 |
| CN | 208722353 U | 4/2019 |
| CN | 109993931 | 7/2019 |
| JP | 2011039738 | 2/2011 |
| WO | WO 2018153021 | 8/2018 |

OTHER PUBLICATIONS

Nakamoto, "Bitcoin: A Peer-to-Peer Electronic Cash System," www.bitcoin.org, 2005, 9 pages.
International Search Report and Written Opinion in PCT Appln. No. PCT/CN2020/071359, dated Apr. 13, 2020, 8 pages (full machine translation).
International Search Report and Written Opinion in PCT Appln. No. PCT/CN2020/071673, dated Apr. 17, 2020, 9 pages (full machine translation).
U.S. Appl. No. 16/813,619, Zhang et al, filed Mar. 9, 2020.

* cited by examiner

ELECTRONIC PAYMENT DEVICE

CROSS-REFERENCE TO RELATED APPLICATIONS

This application is a continuation of PCT Application No. PCT/CN2020/071359, filed on Jan. 10, 2020, which claims priority to Chinese Patent Application No. 201921108573.0, filed on Jul. 15, 2019, and each application is hereby incorporated by reference in its entirety.

TECHNICAL FIELD

The present specification relates to an electronic payment device.

BACKGROUND

On the current market, due to development of mobile phone payment, there are more payment boxes for scanning payment. However, the related payment boxes have no audio broadcast function or have poor audio broadcast quality, which affect customer experience.

SUMMARY

The present specification provides an electronic payment device, where a speaker of the electronic payment device has relatively good sound quality.

An implementation of the present specification provides an electronic payment device, including a console, where the console includes a housing and a speaker disposed in the housing, the housing includes a first sidewall and a second sidewall that extends obliquely from the first sidewall, the first sidewall and the second sidewall form a first space, the first space includes a hollow area, and the speaker faces the hollow area.

Further, the housing further includes an assembling part that extends from the first sidewall into the first space, and the speaker is located in a second space formed by the assembling part.

Further, the assembling part includes sound holes.

Further, the electronic payment device can be placed on a plane, the first sidewall, the second sidewall, and the plane form the first space, and the hollow area is in proximity to where the second sidewall and the plane intersect.

Further, the housing includes a bottom surface that connects the first sidewall and the second sidewall, the first sidewall, the second sidewall, and the bottom surface form the first space, and the hollow area is in proximity to where the second sidewall is connected to the bottom wall.

Further, the hollow area is triangular from a side view of the electronic payment device.

Further, the electronic payment device includes a material plate detachably assembled to the housing.

Further, the housing includes an extension part that extends from the first sidewall, and the extension part includes a recess configured to accommodate the material plate.

Further, the material plate is coplanar with the first sidewall.

Further, one of the extension part and the material plate includes an opening, and the other includes a protrusion to be accommodated in the opening.

Further, the material plate and the housing are fastened together through buckle, sealing, sliding, suction cups, or adhesion.

Further, the electronic payment device includes a scanning window located on the first sidewall and a camera facing the scanning window.

Further, the electronic payment device is a code scanning payment device or a face recognition payment device, the electronic payment device includes a processing module, and the camera is configured to identify a two-dimensional code or a face of a user and transfer information to the processing module.

Further, the electronic payment device includes a sensing apparatus facing the scanning window, and the sensing apparatus is configured to sense a user around the electronic payment device.

Further, the material plate includes two-dimensional code information, and after the sensing apparatus senses a user, the speaker emits a prompt sound to remind the user to scan the two-dimensional code information on the material plate.

Further, the sensing apparatus is an infrared sensor, a distance sensor, or a laser sensor.

Further, the electronic payment device further includes a light source facing the scanning window, and the camera, the light source, and the sensing apparatus are aligned with a middle position of the scanning window.

Further, the electronic payment device includes a pair of light sources arranged in a vertical direction, a light source located above is flush with the top of the sensing apparatus and the camera, and a light source located below is flush with the bottom of the sensing apparatus and the camera.

Further, the electronic payment device includes sensing apparatuses disposed at the bottom of the first sidewall, and the sensing apparatuses are active infrared sensing apparatuses.

It can be determined from the previous technical solutions that, the console of the electronic payment device in the implementations of the present specification includes the housing and the speaker disposed in the housing, the housing includes the hollow area, and the speaker is disposed toward the hollow area, so that a sound emitted by the speaker is propagated again through the hollow area, to strengthen the sound and improve sound quality and volume.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent the same element or similar elements. Implementations described in the following example implementations do not represent all implementations consistent with the present specification. On the contrary, they are only examples of apparatuses that are described in the appended claims in detail and that are consistent with some aspects of the present specification.

The terms used in the present specification are merely used for the purpose of describing specific implementations, and are not intended to limit the present specification. The singular forms "a", "the", and "this" used in the present specification and the appended claims are also intended to include plural forms, unless otherwise specified in the context clearly. It is worthwhile to further understand that, the term "and/or" used in the present specification indicates and includes any or all possible combinations of one or more associated listed items.

It is worthwhile to understand that although terms such as "first", "second", and "third" may be used in the present specification to describe various types of information, these types of information are not limited by these terms. These terms are only used to distinguish between information of the same type. For example, without departing from the scope of the present specification, "first information" can also be referred to as "second information", and similarly "second information" can also be referred to as "first information". Depending on the context, for example, the word "if" used here can be explained as "while", "when", or "in response to determining".

The following describes an electronic payment device in the present specification in detail with reference to the accompanying drawings. Without a conflict, the following implementations and the features in the implementations can be mutually combined.

Figure 1:
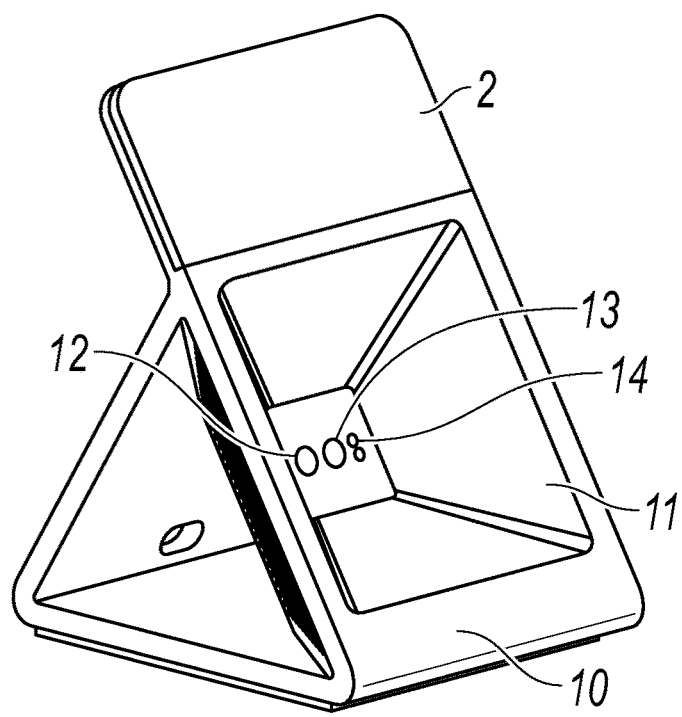
FIG. 1 is a 3D view illustrating an electronic payment device, according to an example implementation of the present specification.
Figure 2:
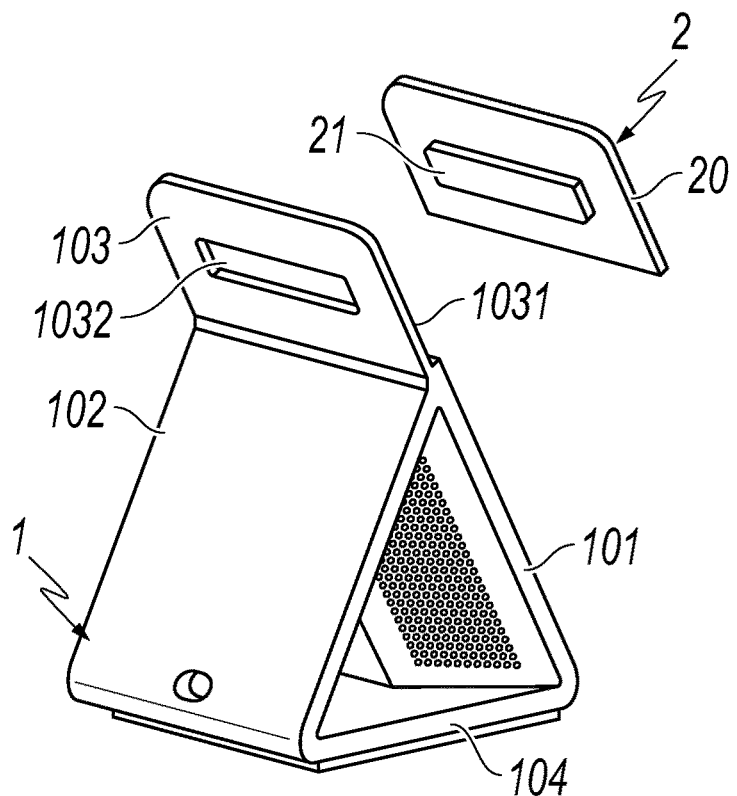
FIG. 2 is a 3D view existing before a console of the electronic payment device shown in FIG. 1 is assembled with a material plate.

Mainly referring to FIG. 1 and FIG. 2, an electronic payment device in an example implementation of the present specification includes a console 1 and a material plate 2 detachably assembled to the console 1. Two-dimensional code information or other guidance terms of a merchant, such as code scanning payment, face scanning payment, or other advertisement information, can be placed on the material plate 2. The material plate 2 is detachable, to conveniently replace material information, thereby improving universality of the electronic payment device.

The console 1 includes a housing 10, a scanning window 11 located on the housing 10, and a speaker (not shown), a sensing apparatus 12, a camera 13, a light source 14, and a processing module (not shown) that are assembled to the housing 10.

The housing 10 includes a first sidewall 101, a second sidewall 102 that extends obliquely from the first sidewall 101, an extension part 103 that extends from the first sidewall 101, and a bottom surface 104 that connects the first sidewall 101 and the second sidewall 102. The scanning window 11 is disposed on the first sidewall 101. The first sidewall 101, the second sidewall 102, and the bottom surface 104 form a first space (not marked). The housing 10 further includes an assembling part 106 that extends from the first sidewall 101 into the first space. The speaker, the sensing apparatus 12, the camera 13, the light source 14, and the processing module are located in second space (not marked) formed by the assembling part 106.

The material plate 2 is detachably assembled to the extension part 103. The material plate 2 includes a base part 20 and a first fastening part 21 that extends from the base part 20. The extension part 103 includes a recess 1031 configured to accommodate the base part 20 and a second fastening part 1032 configured to fit with the first fastening part 21, to fasten the material plate 2 to the extension part 103. After the material plate 2 is assembled to the extension part 103, the material plate 2 is coplanar with the first sidewall 101, to enhance aesthetics of the electronic payment device and facilitate dust cleaning.

In the illustrated implementation, the second fastening part 1032 is an opening, and the first fastening part 21 is a protrusion to be assembled to the opening. The present specification is not limited thereto. One of the extension part 103 and the material plate 2 includes a side (not shown), and the other tightly fits with the side to fasten the material plate 2 to the extension part 103; or the side includes a sliding groove, and the material plate 2 is slid into the extension part 103 from a side of the console 1. Alternatively, one of the extension part 103 and the material plate 2 includes a buckle, and the material plate 2 is fastened to the extension part 103 through buckling. Alternatively, the material plate 2 can be fastened to the extension part 103 through suction cups or adhesion. The suction cups means that the material plate 2 can be fastened to the extension part 103 through magnetic suction cups, vacuum suction cups, etc. The adhesion means that the material plate 2 can be fastened to the extension part 103 through Velcro adhesion, gluing, etc.

Figure 3:
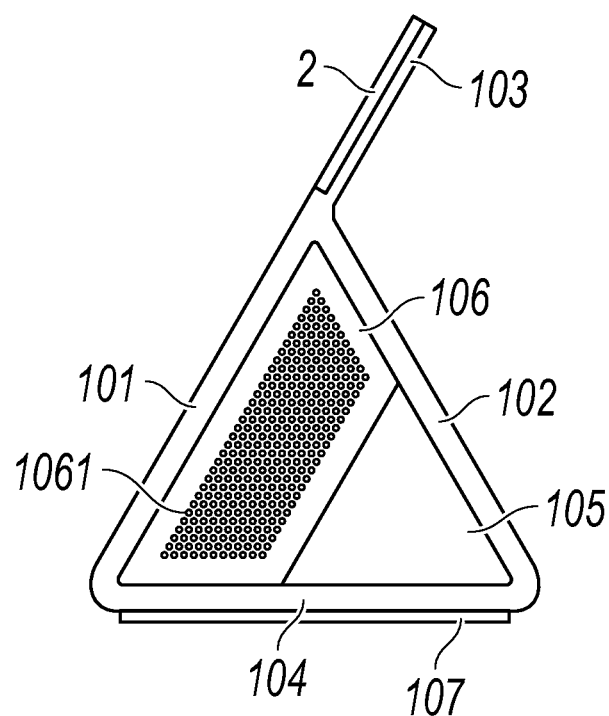
FIG. 3 is a side view illustrating the electronic payment device shown in FIG. 1.

The assembling part 106 includes sound holes 1061 to facilitate emission of a sound emitted by the speaker. The assembling part 106, the second sidewall 102, and the bottom surface 104 form a hollow area 105. The speaker faces the hollow area 105. With reference to FIG. 3, the hollow area 105 is triangular from a side view of the electronic payment device, and a sound emitted by the speaker can be propagated again within the hollow area 105, to strengthen the sound and improve sound quality and volume.

In the illustrated implementation, both opposite ends of the hollow area 105 are connected to the outside. The present specification is not limited thereto. The hollow area 105 can connect to the outside with one end, and the other end of the hollow area 105 can be closed by disposing a sidewall connected to the first sidewall 101 and the second sidewall 102 on the housing 10.

In the illustrated implementation, the housing 10 includes the bottom surface 104 that connects the first sidewall 101 and the second sidewall 102, and the hollow area 105 is in proximity to where the second sidewall 102 is connected to the bottom surface 104. The present specification is not limited thereto. The bottom surface 104 may not be disposed on the housing 10, the electronic payment device is placed on a plane (for example, a desktop), the first sidewall 101 and the second sidewall 102 abut the plane, and the hollow area 105 is in proximity to where the second sidewall 102 and the plane intersect.

The electronic payment device further includes an anti-slip piece 107 disposed on the bottom surface 104, to enhance stability of the electronic payment device when being placing on a desktop, to prevent the electronic payment device from sliding.

In the illustrated implementation, the electronic payment device is a code scanning device. When using the code scanning device, a user aligns payment code with the scanning window 11 of the code scanning device, the camera 13 obtains information about the payment code and sends the information about the payment code to the processing module, and the processing module is configured to send the information about the payment code to a back end server, so that payment can be performed. The present specification is not limited thereto. Alternatively, the electronic payment device can be a face scanning payment device. When using the face scanning payment device, a face of a user is aligned with the scanning window 11 of the face scanning payment device, the camera 13 obtains information about the face of the user and sends the information about the face of the user to the processing module, and the processing module is configured to send the information about the face of the user to a back end server, so that payment can be performed. Alternatively, the electronic payment device in the present specification can perform payment by identifying, for example, a fingerprint. The light source 14 is configured to illuminate the scanning window 11, to enhance photographing effect of the camera 13.

The sensing apparatus 12 can sense whether there is a person around the electronic payment device. If the sensing apparatus 12 senses that there is a person around the electronic payment device, the speaker sends related prompt information, such as an audio reminder to remind the user to scan the two-dimensional code information on the material plate 2 for official account subscription, electronic member registering, or card binding, so that no reminder needs to be manually performed to save manpower. In the illustrated implementation, the sensing apparatus 12 is a pyroelectric infrared sensor, and can identify whether there is a person within one meter. Alternatively, the sensing apparatus 12 can be a distance sensor, a laser sensor, etc. The speaker can further remind the user to perform payment, notify the user of a payment result, etc.

In the illustrated implementation, the sensing apparatus 12, the camera 13, and the light source 14 are aligned with a middle position of the scanning window 11, to improve recognition rates of the sensing apparatus 12 and the camera 13, and effectively ensure that light emitted by the light source 14 can illuminate the entire scanning window 11 as much as possible. In the illustrated implementation, two light sources 14 are disposed in a vertical direction. An upper light source 14 is flush with the top of the sensing apparatus 12 and the camera 13, and a lower light source 14 is flush with the bottom of the sensing apparatus 12 and the camera 13.

Figure 4:
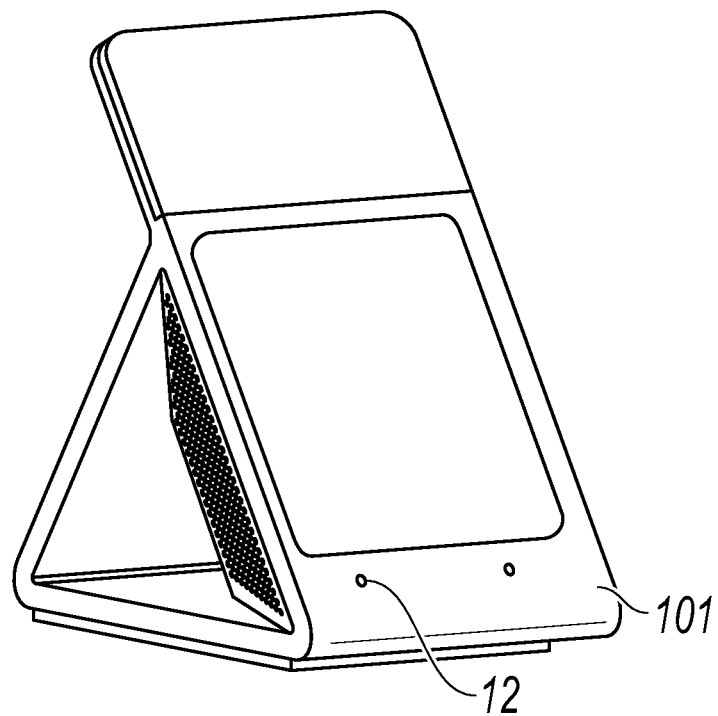
FIG. 4 is a 3D view illustrating another implementation of an electronic payment device, according to an example implementation of the present specification.

In the illustrated implementation, the sensing apparatus 12 is located on a side of the camera 13. The present specification is not limited thereto. Referring to FIG. 4, the sensing apparatus 12 is an active transceiver infrared sensor and is located at the bottom of the first sidewall 101, and a pair of sensing apparatuses 12 are disposed. The sensing apparatus 12 actively transmits infrared, and determines, based on strength of reflected waves, whether there is an object in front of the electronic payment device, so that the sensing apparatus 12 has a good sense of direction, and can more accurately sense existence of a person.

The electronic payment device in this implementation of the present specification includes the console 1, where the console 1 includes the housing 10 and the speaker disposed in the housing 10, the housing 10 includes the hollow area 105, and the speaker is disposed toward the hollow area 105, so that a sound emitted by the speaker is propagated again through the hollow area 105, to strengthen the sound and improve sound quality and volume. The electronic payment device includes the sensing apparatus 12, the sensing apparatus 12 senses a person, and the speaker sends prompt information, such as a prompt used to guide the user to pay attention to an official account or a payment method or notify the user of information that the payment is made. The electronic payment device further includes the material plate 2 detachably assembled to the console 1, to conveniently place material information and replace material information.

A person skilled in the art can easily figure out other implementation solutions of the present specification after considering the present specification and practicing the present specification disclosed here. The present specification is intended to cover any variations, functions, or adaptive changes of the present specification. These variations, functions, or adaptive changes comply with general principles of the present specification, and include common knowledge or a commonly used technical means in the technical field that is not disclosed in the present specification. The present specification and the implementations are merely considered as examples, and the actual scope and spirit of the present specification are pointed out by the following claims.

It is worthwhile to further note that the term "include", "comprise", or their any other variant is intended to cover a non-exclusive inclusion, so that a process, method, product, or device that includes a series of elements not only includes those elements but also includes other elements that are not expressly listed, or further includes elements inherent to such process, method, product, or device. An element preceded by "includes a . . . " does not, without more constraints, preclude the presence of additional identical elements in the process, method, product, or device that includes the element.

The previous descriptions are merely example implementations of the present specification, but are not intended to limit the present specification. Any modification, equivalent replacement, improvement, etc. made without departing from the spirit and principle of the present specification shall fall within the protection scope of the present specification.

What is claimed is:

1. An electronic payment device, comprising:
   a console comprising:
      a housing comprising:
         a first sidewall; and
         a second sidewall that extends obliquely from the first sidewall and forms a covered space with the first sidewall, wherein the covered space comprises a hollow space; and
      a speaker inside the housing, wherein the speaker is disposed at an orientation facing the hollow space;
   a material plate detachably assembled to the housing;
   a scanning window located on the first sidewall;
   a camera facing the scanning window; and
   a sensor that faces the scanning window, wherein the sensor is configured to sense a user in proximity to the electronic payment device.

2. The electronic payment device according to claim 1, wherein the housing further comprises:
   an assembly part that extends from the first sidewall into the covered space, wherein the speaker is disposed in an inner space formed by the assembly part and the first sidewall.

3. The electronic payment device according to claim 2, wherein the assembly part defines openings for transferring sound.

4. The electronic payment device according to claim 1, wherein:
   when the electronic payment device is placed on a surface, the covered space is formed by the first sidewall, the second sidewall, and the surface; and
   the hollow space is in proximity to an intersection of the second sidewall and the surface.

5. The electronic payment device according to claim 1, wherein:
   the housing comprises a bottom wall that connects the first sidewall and the second sidewall;
   the covered space is formed by the first sidewall, the second sidewall, and the bottom wall; and the hollow space is in proximity to an intersection of the second sidewall and the bottom wall.

6. The electronic payment device according to claim 5, wherein, from a side view of the electronic payment device, the hollow space forms a triangular shape.

7. The electronic payment device according to claim 1, wherein:
a portion of the first sidewall extends beyond an intersection of the first sidewall and the second sidewall; and
the portion comprises a recess that accommodates at least a portion of the material plate.

8. The electronic payment device according to claim 7, wherein a front surface of the material plate is coplanar with the first sidewall.

9. The electronic payment device according to claim 7, wherein the material plate comprises a protrusion that fits into the recess.

10. The electronic payment device according to claim 1, wherein the material plate and the housing are attached together through one of snapping, sealing, a sliding groove, a suction cup, or adhesion.

11. The electronic payment device according to claim 1, wherein the electronic payment device:
is a code scanning payment device or a face recognition payment device; and
further comprises:
at least one processor; and
a memory that stores programming instructions, wherein the programming instructions, when executed by the at least one processor, cause the camera to capture information associated with a two-dimensional code or a face of a user and to transfer the information to the at least one processor.

12. The electronic payment device according to claim 1, wherein:
the material plate comprises a two-dimensional code; and
the speaker sounds a notification to notify the user to scan the two-dimensional code in response to sensing that the user is in proximity to the electronic payment device.

13. The electronic payment device according to claim 1, wherein the sensor is at least one of an infrared sensor, a range sensor, or a laser sensor.

14. The electronic payment device according to claim 1, wherein the electronic payment device further comprises:
a light source facing the scanning window; and
the camera, the light source, and the sensor are disposed in a center position of the scanning window.

15. The electronic payment device according to claim 14, wherein the electronic payment device comprises:
a pair of light sources arranged in a vertical direction.

16. The electronic payment device according to claim 15, wherein:
an upper surface of an upper light source of the pair of light sources is flush with an upper surface of the sensor; and
a lower surface of a lower light source of the pair of light sources and an upper surface of the camera is flush with a lower surface of the sensor and a lower surface of the camera.

17. An electronic payment device, comprising:
a console comprising:
a housing comprising:
a first sidewall; and
a second sidewall that extends obliquely from the first sidewall and forms a covered space with the first sidewall, wherein the covered space comprises a hollow space; and
a speaker inside the housing, wherein the speaker is disposed at an orientation facing the hollow space;
a material plate detachably assembled to the housing;
a scanning window located on the first sidewall;
a camera facing the scanning window; and
an active infrared sensor disposed proximately lower on the first sidewall.

* * * * *